Figure 1:
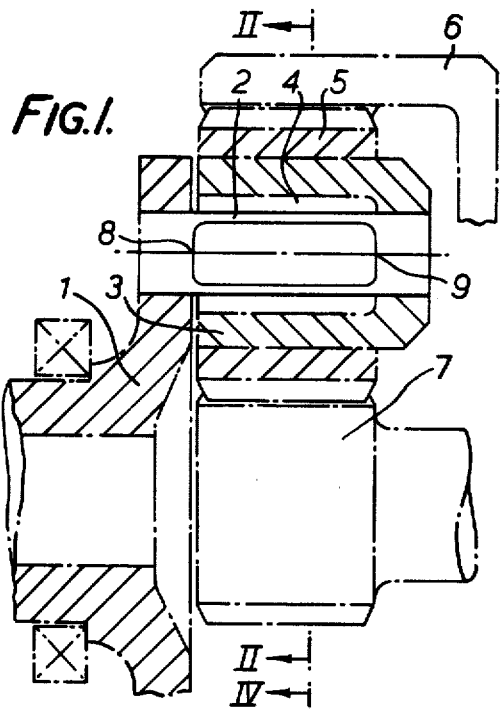

United States Patent [19]
Hicks

[11] 3,983,764
[45] Oct. 5, 1976

[54] GEARS

[75] Inventor: Raymond John Hicks, Llanwrthwl, Wales

[73] Assignee: Vickers Limited, London, England

[22] Filed: June 16, 1975

[21] Appl. No.: 587,136

[52] U.S. Cl. .................................... 74/410; 74/409; 74/411
[51] Int. Cl.² .................. F16H 55/18; F16H 57/00
[58] Field of Search ...................... 74/410, 411, 409

[56] References Cited
UNITED STATES PATENTS
3,303,713   2/1967   Hicks ........................... 74/410 X Primary Examiner—Leonard H. Gerin
Attorney, Agent, or Firm—Reed Smith Shaw & McClay

[57] ABSTRACT

A flexible, cantilevered, gear wheel support, comprising a flexible pin mounted at one end in a rotating carrier and carrying at the other end a gear wheel the axis of which, when the pin flexes, remains parallel to the position of this axis in the pin unflexed condition; the pin between its mounting on the carrier and its part that carries the gear wheel presenting a greater resistance to bending in planes radial of the rotational path of the carrier than it presents to bending in planes tangential to this path.

4 Claims, 4 Drawing Figures

U.S. Patent   Oct. 5, 1976   3,983,764

GEARS

This invention relates to gears, and whilst primarily concerned with the mounting of planet pinions in epicyclic gearing, may also be applicable to other forms of parallel shaft mounted gear trains. The expression "epicyclic gearing" is used herein to refer to gear arrangements which comprise a central sun pinion, a plurality of planet pinions, meshed therewith, and an annulus gear surrounding the planet pinions and meshed therewith; the planet pinions being mounted upon a carrier member which is rotational in operation.

The nature of the gear wheel mountings with which this invention is concerned is disclosed in British Patent No. 1,101,131 wherein epicyclic gearing is described in which each planet pinion is carried on a sleeve arranged co-axially with and supported by a flexible pin mounted as a cantilever from a carrier, the purpose of the cantilevered flexible pins being to permit small positional changes of the axes of rotation of the planet pinions, during operation, and yet to permit the planet pinions to retain true parallel alignment with the axes of the mating gears to facilitate a load sharing function within the gear train.

With normal applications for epicyclic gearing, using the flexible cantilever pin type of planet pinion support just discussed, wherein, for example, the carrier is caused to rotate in order to transmit power by means of tooth loads applied to the planet pinions, there will be a fixed excursion on each planet pinion, appropriate to its tooth loading and the flexural resistance of its associated pin. Superimposed on this excursion there will be a secondary plus or minus fractional excursion, not necessarily cyclic yet nevertheless variable, as the gears rotate, arising from inaccuracies in manufacture, as, for example, in the pitching of the gear teeth or the machining of the bores in the carrier to receive the support pins. These excursions will take place in planes tangential to the pitch circle of the flexible pins mounted on the carrier. Due to the parallel action of the planet pinion mounting under conditions of flexure, there will be no adverse effect on the meshing of the gears directly attributable to these deflections.

On the other hand, in cases where the planet pinion carrier operates at high rotational speeds, as for aircraft or gas turbine applications, or where the effective mass of the cantilevered assembly, the angular velocity and the radius of action combine, collectively, to create centrifugal forces, excursions of the planet pinions will take place in the radial direction also. In the event of the centrifugal forces being of significant magnitude, the radial excursions of the planet pinions can be in excess of the tolerable displacement for correct meshing of the gear teeth of the pinions with their mating gears. This is a disadvantage of the cantilevered resilient pin type of support, particularly as the centrifugal force, and hence the resulting flexural excursion, is a function of the square of the rotational speed, whereas the torque governing the tangential excursion is inversely proportional to rotational speed. Thus, for a given power, an increase in carrier speed will reduce the necessary torque and hence the tangential deflection inversely as the speed change ratio, whereas the radial excursion, due to centrifugal force, will increase as the square of the speed change ratio. Further, a radial excursion of the planet pinion from its normal position moves the pitch circle of the pinion out of rolling contact with the pitch circles of the sun wheel and the annulus gear, thereby causing incorrect tooth meshing which can only be rectified by tooth profile correction or adjustments to clearance in the tooth spaces.

According to one aspect of the present invention there is provided a flexible, cantilevered, gear wheel support, comprising a flexible pin mounted at one end in a carrier which is rotational in operation, and carrying at the other end a gear wheel such that the axis of the gear wheel, when the pin flexes under operational loads, remains parallel to the position of this axis in the pin unflexed condition; the pin between its mounting on the carrier and its part that carries the gear wheel being so shaped as to present a greater resistance to bending in planes radial of the rotational path of the carrier than that presented to bending in planes tangential to this path.

According to another aspect of the present invention there is provided a gear train having gear wheels mounted on gear wheel supports, each support being as just defined.

Figure 2:
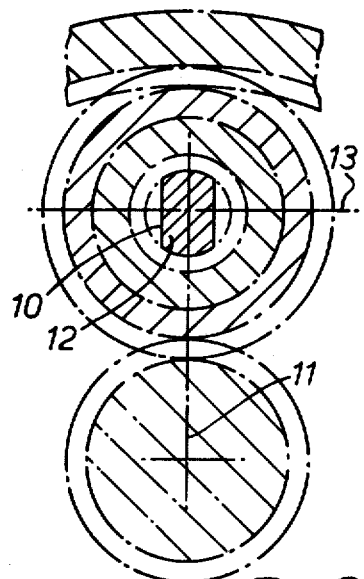
Figure 3:
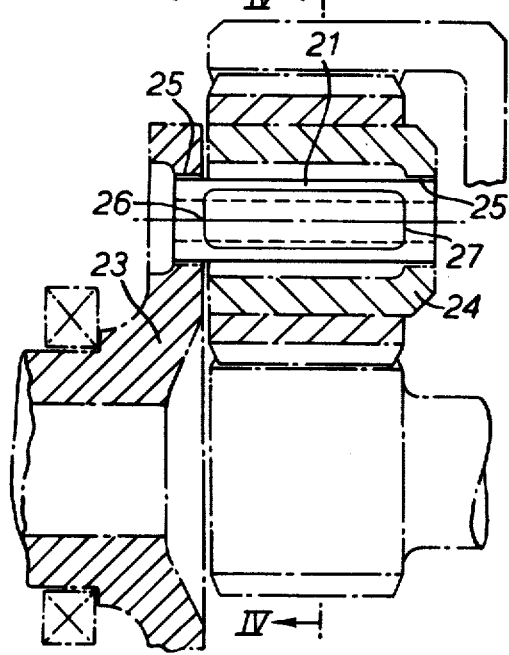
Figure 4:
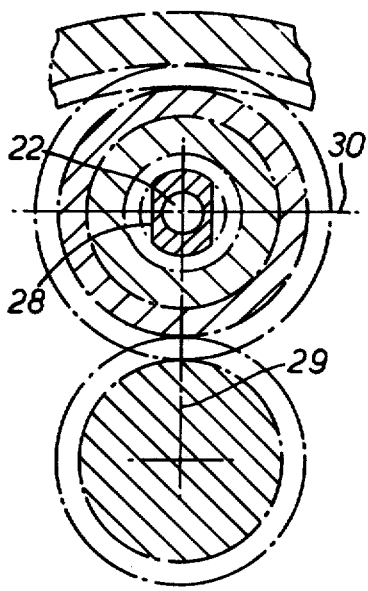

For a better understanding of the invention and to show how the same may be carried into effect, reference will now be made, by way of example, to the accompanying drawings, in which:

FIG. 1 is a diagrammatic sectional side view of part of a first form of epicyclic gear, FIG. 2 is a section taken on the line II—II of FIG. 1, FIG. 3 is a view similar to FIG. 1 of part of a second form of epicyclic gear, and FIG. 4 is a section taken on the line IV—IV of FIG. 3.

Referring first to FIG. 1, which is a part section in a radial plane 11 (FIG. 2) of an epicyclic gear planet pinion flexible cantilever mounting, and FIG. 2, a carrier 1 is provided with a plurality of resilient pins 2, which are fast with and supported by the carrier 1 at one end. The unmounted end of each pin 2 is fast with a tubular sleeve 3 which is mounted coaxially about the pin 2 in such a manner as to provide an annular space 4 about the pin between the pin and the sleeve, within which space transverse, elastic, flexural movement of the pin can take place without the sleeve making contact with the pin surface.

The sleeve carries a planet pinion 5 which engages with an annulus gear 6 and a sun pinion 7. The ends of the resilient pin 2, which is solid, in engagement with the carrier 1 and sleeve 3 respectively, have a uniform circular section over the length of their engagements with the carrier 1 and the sleeve 3, to which they are attached by means of press or force fits. The lengths of these engagements, in relation to the pin diameter, are sufficient to ensure adequate grip forces, over the flexural length of the pin, between the line of engagement 8 with the carrier and the line of engagement 9 with the sleeve. Between these lines of engagement 8, 9, the cross-section of the pin 2 is part circular, (FIG. 2), the pin having opposed flat surfaces 10 parallel to the radial plane 11. The cross-section of the pin has thus a greater second moment of area about a neutral axis in the tangential plane 13 than the second moment of area about a neutral axis in the radial plane 11. Hence, the resistance to bending of the pin in the radial plane 11 is greater than the resistance to bending in the tangential plane 13.

In the form of FIGS. 3 and 4 each pin 21 (corresponding to the pins 2 of FIGS. 1 and 2) has a hollow uniform bore 22 for weight saving purposes concentric with its axis, extending throughout the full length of the pin. The ends of the pin engaging with the carrier 23 and the sleeve member 24 respectively, are attached thereto by means of welds 25 effected by the process known as electron beam welding by which means the lengths of these engagements may be shorter than required for press fits, again saving weight. Between the line of engagement 26 with the carrier, and the line of engagement 27 with the sleeve, flat surfaces 28 are formed at the sides of the pin, as in the pins 2 in FIGS. 1 and 2. Hence the resistance to bending of the pin 21 in the radial plane 29 is greater than its resistance to bending in the tangential plane 30, as is the case for each pin 2.

Higher rotational speeds are possible for epicyclic gears provided with flat sided pins of asymmetric section arranged as described with the greater resistance to bending in the radial plane, than similar gears provided with pins of circular section having a resistance to bending equal to that of the flat sided pins in the tangential direction only, since radial displacements of the planet pinions, caused by centrifugal forces, and the consequent errors in meshing of the gear teeth, are suppressed, enabling size to be reduced and therefore weight, and hence manufacturing costs, to be reduced. The tangential component of excursion is, however, not impeded nor in any manner are the load sharing features of the cantilever flexible pin planet pinion mountings influenced.

I claim:

1. A flexible, cantilevered, gear wheel support, comprising a flexible pin mounted at one end in a carrier which is rotational in operation, and carrying at the other end a gear wheel such that the axis of the gear wheel, when the pin flexes under operational loads, remains parallel to the position of this axis in the pin unflexed condition; the pin between its mounting on the carrier and its part that carries the gear wheel being so shaped as to present a greater resistance to bending in planes radial of the rotational path of the carrier than that presented to bending in planes tangential to this path.

2. A gear wheel support according to claim 1, wherein the pin between its mounting on the carrier and its part that carries the gear wheel is substantially part circular with opposed flat surfaces that are substantially parallel to a plane radial of the rotational path of the carrier.

3. A gear wheel support according to claim 1, wherein the pin is hollow.

4. A gear train having gear wheels mounted on gear wheel supports, each support being as claimed in claim 1.

* * * * *